United States Patent
Prakken

(10) Patent No.: US 6,928,789 B2
(45) Date of Patent: Aug. 16, 2005

(54) ASSEMBLY FOR COLLECTING TOGETHER DIFFERENT GOODS

(75) Inventor: Nicolaas Martin Prakken, Kamerik (NL)

(73) Assignee: BluePrint Holding B.V., CH Woerden (NL)

( * ) Notice: Subject to any disclaimer, the term of this patent is extended or adjusted under 35 U.S.C. 154(b) by 0 days.

(21) Appl. No.: 10/801,536

(22) Filed: Mar. 17, 2004

(65) Prior Publication Data

US 2004/0195073 A1 Oct. 7, 2004

(30) Foreign Application Priority Data

Mar. 17, 2003 (NL) .............................................. 1022955

(51) Int. Cl.[7] .......................... B65B 35/54; B65G 47/10
(52) U.S. Cl. ........................ 53/154; 53/537; 198/418.1; 198/448
(58) Field of Search .......................... 53/154, 443, 448, 53/537; 198/348, 358, 370.02, 443, 418.1, 444, 418.2, 445, 447, 448, 452, 453

(56) References Cited

U.S. PATENT DOCUMENTS

| | | | | |
|---|---|---|---|---|
| 3,032,211 A | * | 5/1962 | Wordsworth | ............. 198/418.1 |
| 3,466,839 A | * | 9/1969 | Temple | ......................... 53/154 |
| 3,909,922 A | * | 10/1975 | Takasaki et al. | ............... 29/563 |
| 4,630,428 A | | 12/1986 | Lesch | |
| 4,642,967 A | * | 2/1987 | Culpepper | .................... 198/458 |
| 4,844,234 A | * | 7/1989 | Born et al. | .................. 198/458 |
| 5,161,665 A | * | 11/1992 | Cragun | ........................ 198/448 |
| 5,174,430 A | * | 12/1992 | Ebira | ....................... 198/418.5 |
| 5,660,263 A | * | 8/1997 | Moncrief et al. | ............ 198/445 |
| 5,768,860 A | * | 6/1998 | Weaver | ........................ 198/445 |
| 6,308,817 B1 | * | 10/2001 | Corniani et al. | ............... 53/448 |
| 6,398,461 B1 | | 6/2002 | Vincent et al. | |
| 6,834,755 B2 | * | 12/2004 | Jay | .......................... 198/418.6 |

FOREIGN PATENT DOCUMENTS

| | | |
|---|---|---|
| DE | 25 37 692 | 2/1977 |
| GB | 1 413 385 | 11/1975 |
| GB | 1 587 715 | 4/1981 |

* cited by examiner

Primary Examiner—Louis Huynh
(74) Attorney, Agent, or Firm—Young & Thompson

(57) ABSTRACT

Assembly and method for collecting together different goods to form a pack and to pack these in an outer packaging. Streams of goods are always fed to a collection conveyor with feed conveyors. Each stream consists of the same goods and these are buffered at the discharge end of the feed conveyor. At a suitable point in time these are placed on the collection conveyor using an ejection device. The collection conveyor consists of a number of track compartments that move past the conveyor. A group of goods placed one after the other is arranged in each track compartment, which group is ultimately compacted to give a pack.

5 Claims, 3 Drawing Sheets

ASSEMBLY FOR COLLECTING TOGETHER DIFFERENT GOODS

BACKGROUND OF THE INVENTION

The present invention relates to an assembly for collecting different goods comprising at least two feed conveyors for said goods, a collection conveyor extending at an angle to said feed conveyors, one end of which is arranged below said feed conveyors close to the discharge end thereof to receive the products therefrom and the other end of which is constructed to collect together said goods to form a pack. An assembly of this type is disclosed in U.S. Pat. No. 4,630,428.

For a wide variety of applications it is necessary to bring different goods together. These are then transferred to an outer packaging in a further step. Such goods can already be packed as such and although these packs can be identical, the content of the packs can differ. Great care is required, especially if vulnerable goods have to be transferred.

Various types of crisps or similar savoury snacks that are put on sale in an outer packaging is one example of collecting together different goods. The number of different flavours in an outer packaging can be from two to a few tens.

Such goods have to be packed at high speed, but because they are of a nature that is susceptible to damage (breakage of the product) they must always be fully guided. Furthermore, there is the problem that the supply of the different streams of goods is not always continuous. Such goods are supplied by feed conveyors but it cannot be guaranteed that all feed conveyors are continuously able to discharge a continuous stream of goods. The consequence of a malfunction in the discharge from a single feed conveyor is that a pack consisting of different goods can no longer be made up and that the entire process comes to a halt. It will be understood that there can be a substantial loss of production as a result.

A system for filling boxes with different sweets is described in U.S. Pat. No. 4,630,428. Rows of sweets next to one another are buffered at the discharge end of a feed conveyor. There the sweets are picked up one by one by a gripper device with an arm and by means of a transfer movement are placed in the desired position in the sweet packs located underneath. Only a limited speed can be achieved with such an installation, whilst positioning the sweets next to one another has the associated risk of damage and sticking together.

In GB 158 715 the discharge ends of a number of feed conveyors emerge onto a common collection conveyor without buffering. Control of the metering of the different products onto the collection conveyor is not possible.

SUMMARY OF THE INVENTION

One aim of the present invention is to provide au assembly by means of which it is possible to make up packs of different goods and then to pack these together.

This aim is realised according to a first aspect of the invention with an assembly for collecting different goods comprising at least two feed conveyors for said goods, a collection conveyor extending at an angle to said feed conveyors, one end of which is arranged below said feed conveyors close to the discharge end thereof to receive the products therefrom and the other end of which is constructed to collect together said goods to form a pack characterised in that said feed conveyors comprising containers for accommodating said goods and discharge means for discharging said goods on to said collection conveyor said collection conveyor having, close to said one end, at least two separate transport lines arranged in parallel next to one another with a common drive for said goods, wherein close to said other end there is no such separation and means for moving said goods towards one another in a direction essentially transverse to said direction of transport are arranged close to said other end.

According to a preferred embodiment of the present invention the goods are buffered close to the discharge end of the feed conveyor. This buffering can take place by placing the goods in containers located some distance apart. In this way damage to the goods is prevented. Discharging can be realised by outwardly sliding from the container or tilting away the bottom thereof, so that goods drop onto the collection conveyor located at a lower level. The drop height can be very restricted product height) as a result of which the risk of damage is likewise negligible. In this way the goods can be removed from the containers particularly rapidly. Consequently they can enable the discharge operation to run at high speed and, on the other hand, this can be implemented very accurately. By providing guides on the collection conveyor, which preferably are constructed as longitudinal guides, it is furthermore ensured that the goods are always in the correct position.

Container in this patent is any means for individually handling of goods and can comprise spaced baffles, a tray and the like.

It will be understood that with the present invention it is particularly easily possible to obtain changing compositions by changing the discharge end of the discharge conveyors. Buffering makes it possible to compensate for interruptions in the feed without his immediately resulting in no further goods being discharged onto the collection conveyor. In principle, any feed conveyor with possibly a buffer system can be used. In the state of the art constructions are known which have chains or other transport members that engage on the containers using friction. By holding back the last holder the drive member slips past it. The subsequent containers then butt up against the last holder. If the last holder discharges the product it is possible, after slight movement, to hold back the next holder until this discharges the product it contains.

Furthermore flight conveyors can be used having a fixed connection of flight and conveyor belt.

A further example of such a discharge conveyor is found in U.S. patent application Ser. No. 10/057,980 in the name of Blue Print Holding.

By providing separate transport lines each pack can be guided individually. As a result it is possible both to maintain the position and to prevent damage occurring. A number of discharge conveyors are arranged one after the other in the direction of flow of the collection conveyor. A number of "track compartments" is defined in the collection conveyor. These are successive spaces that move past the various discharge ends of the discharge conveyors and ultimately emerge at a collection station or the like for the packs of goods made up according to the invention. Such track compartments can be formed, for example, by bars, partitions and the like extending transversely to the direction of movement of the collection conveyor. Such bars or partitions provide the driving force for the transport and one track compartment is in each case delimited between such bars or partitions. When such a track compartment passes below the discharge conveyor concerned, one of the goods from a discharge conveyor is placed in the transport line concerned.

When the track compartment arrives at the next discharge conveyor, a subsequent pack from the discharge conveyor concerned is placed in the next transport line. By choosing the length of the track compartments to be greater than the (transport) length of the goods a system is obtained that is less susceptible to the goods being discharged somewhat too late or somewhat too early at the discharge end. The discharge of the goods from the discharge end of the feed conveyors can be implemented by any conceivable means. Examples are expulsion means that drive the goods out of the containers and tilt means that tilt the containers, as a result of which the goods slide out of the containers.

In the manner described above groups or a pack of goods will be produced near the other end of the collection conveyor. The goods can be moved towards one another by then removing the separation between the transport lines. In the first instance this can be achieved by narrowing the end guides for the group of goods. Active movement towards one another can then optionally take place. It is also possible to implement these latter operations during the fitting of an outer packaging such as a tube of foil material. It is also possible to place a pack of goods in a box or crate with the aid of a robot or the like. The invention also relates to a method for making up a pack of different goods, comprising feeding different streams to a collection conveyor, wherein each stream always contains the same goods and wherein said goods are buffered before discharge to said collection conveyor and discharging said goods from said buffer onto said collection conveyor, wherein said goods are guided during transport on the collection conveyor and track compartments are provided on said collection conveyor for the movement of a group of goods.

BRIEF DESCRIPTION OF THE DRAWINGS

The invention will be explained in more detail below with reference to illustrative embodiments shown in the drawing. In the drawing.

DETAILED DESCRIPTION OF THE DRAWINGS

Figure 1:
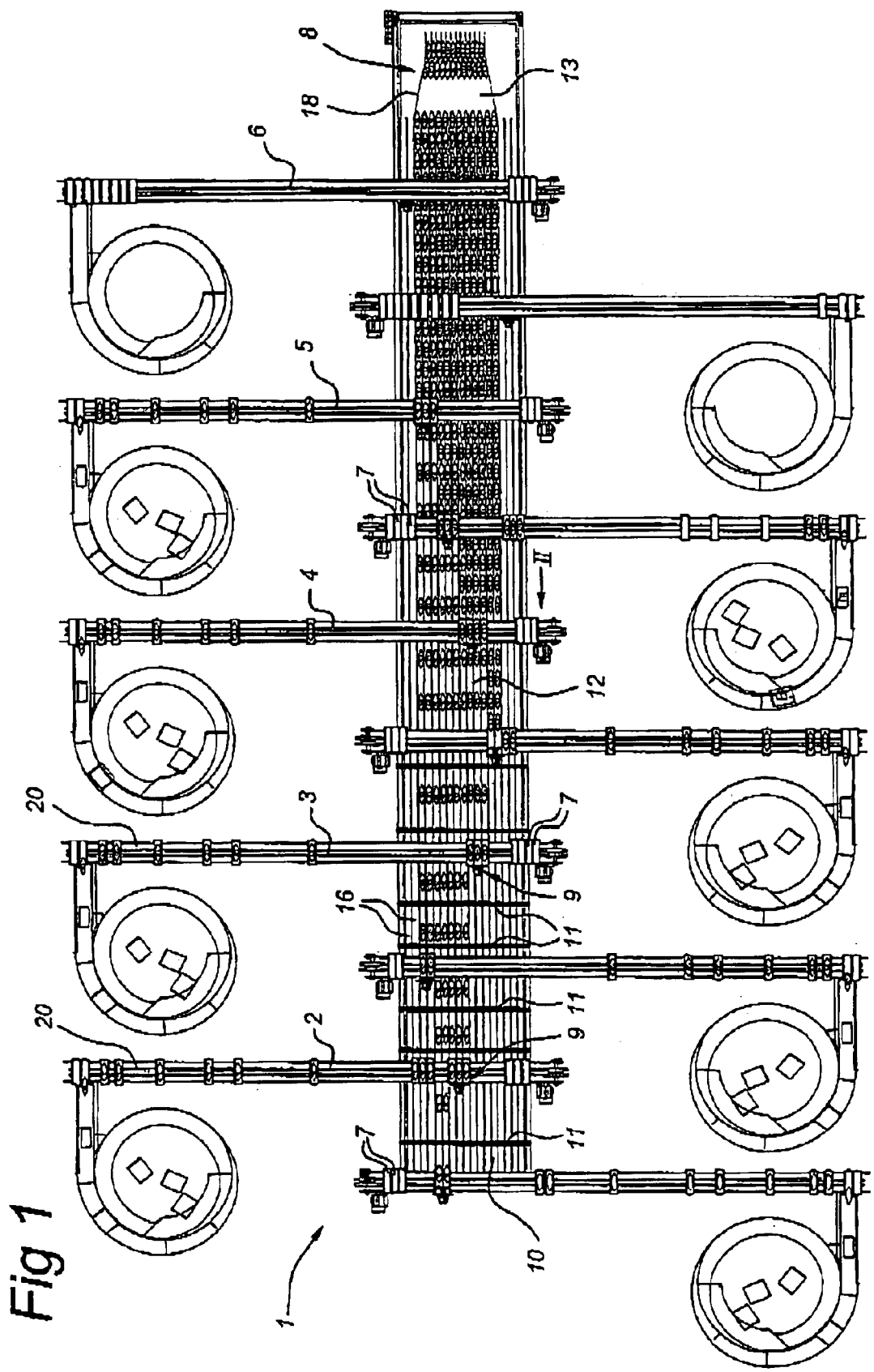
FIG. 1 shows, diagrammatically, a plan view of the assembly according to the invention.
Figure 2:
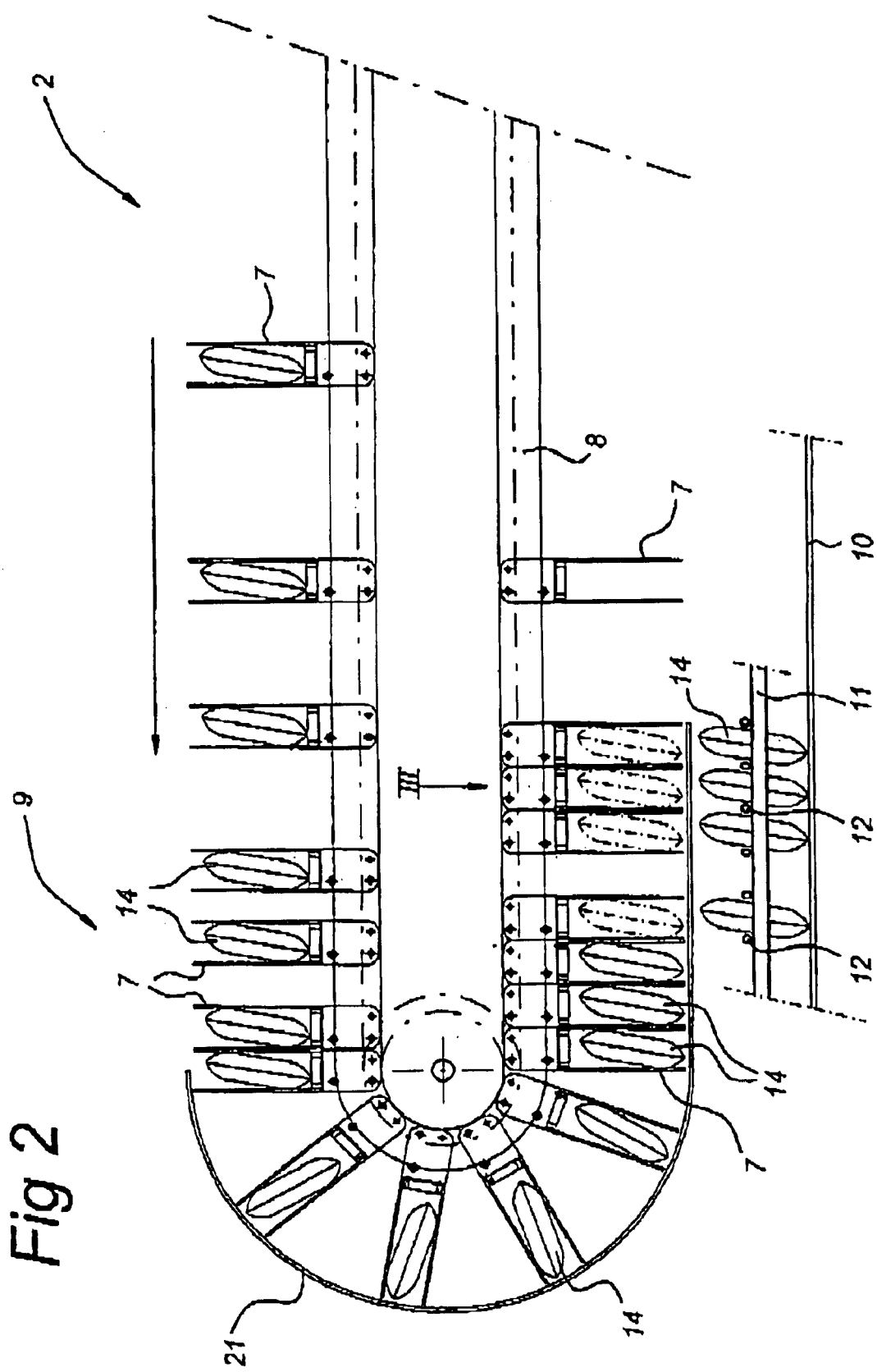
FIG. 2 shows, diagrammatically, a side view of the discharge end of a feed conveyor above the collection conveyor.
Figure 3:
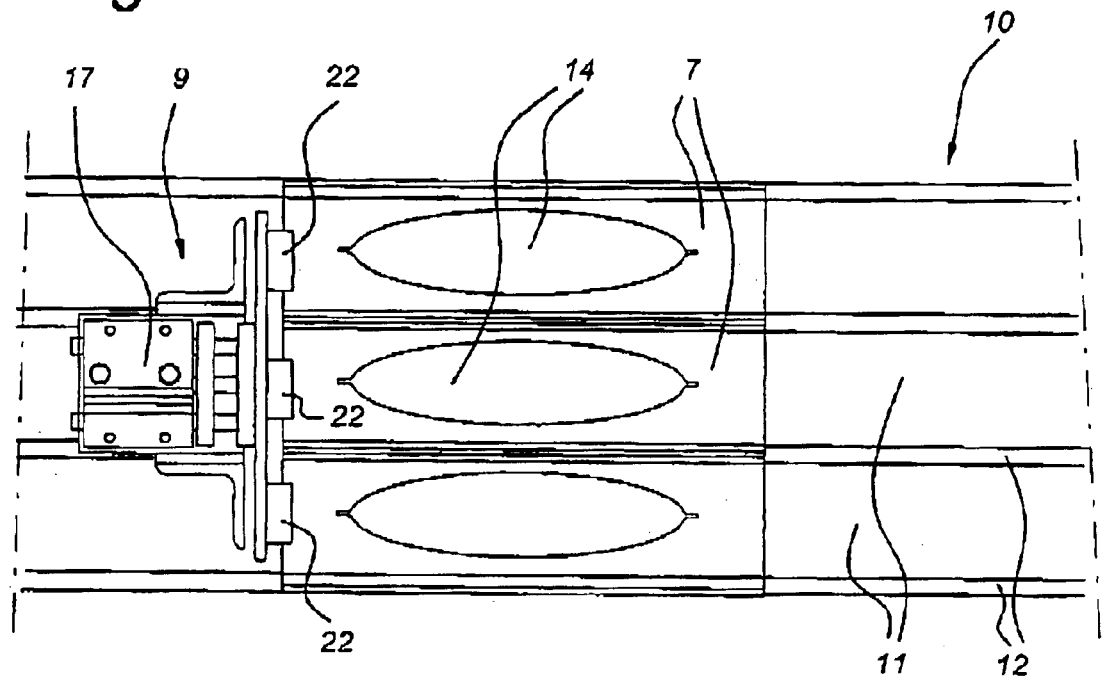
FIG. 3 shows the ejection mechanism for the pack.
Figure 4:
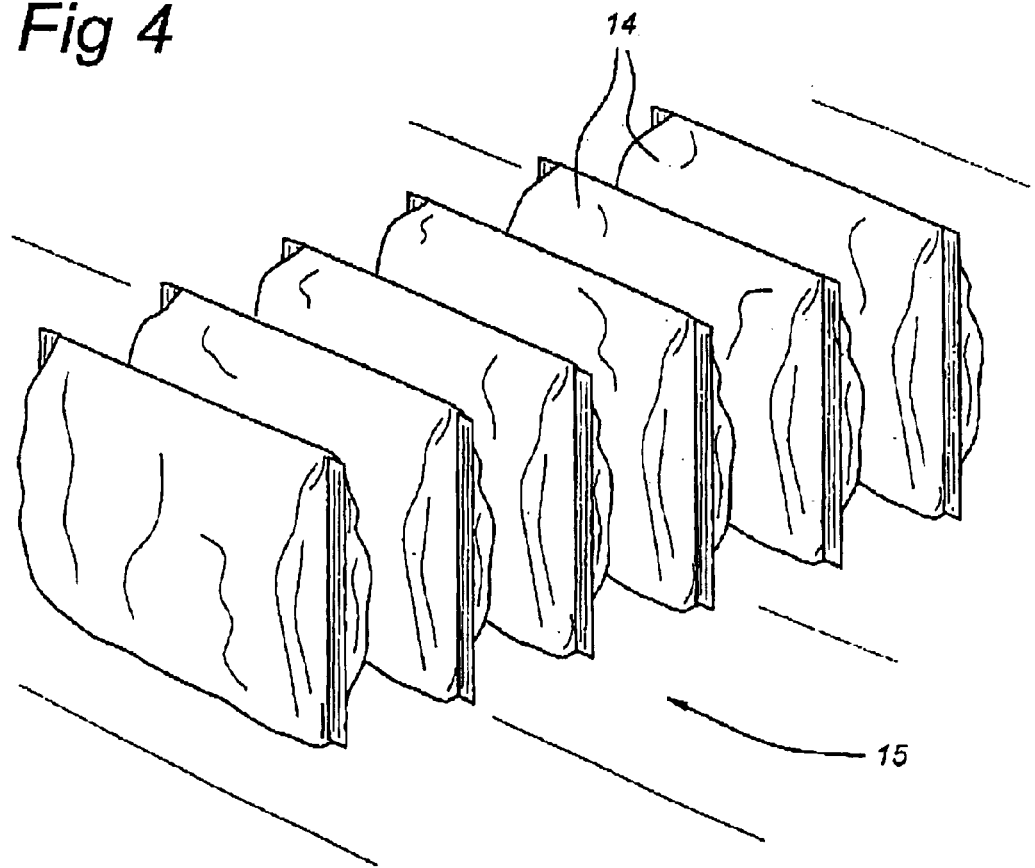
FIG. 4 shows a group of packs formed using the assembly and the method according to the invention.

In FIG. 1 the assembly according to the invention is shown by 1. This consists of a number of feed conveyors 2–6. These are coupled to an installation, not shown in detail, for placing the goods, such as bags of sweets, in a specific position. Each feed conveyor 2–6 is designed to move a specific group of goods. Each feed conveyor consists of a conveyor member 20, such as a chain or belt or number of belts. There are a large number of containers 7 on each feed conveyor. These move with the conveyor in the direction of transport of the chain or belt 20. They are brought to a halt at a desired end position above the collection conveyor 10. This is not shown in more detail in the figures. As an example reference is made to U.S. patent application Ser. No. 10/057,980. Other mechanisms for holding back the "last" holder 7 such as are generally known in the state of the art can be employed. As a result of holding back the "last" holder 7 the following containers will be buffered in contact with this or in the immediate vicinity thereof. The packs are prevented from leaving the containers 7 prematurely by stationary guide 21. Products 14 can be driven out of the holder concerned with the aid of ejection means 17 with projections 22, shown in FIG. 3, and land on the collection conveyor 10 (FIG. 2). This collection conveyor 10 consists of a number of lines 16 moving towards the discharge end 8 (FIG. 1). These lines are separated by stationary longitudinal guides 12. It will be understood that these can also move with the collection conveyor. Transport along the collection conveyor is achieved by transverse bars 11 that are at some height above the supporting surface of the collection conveyor.

The longitudinal guides 12 described above continue to close to the discharge end 8 indicated in FIG. 1. At this location the pack of goods is considered to have been brought together and only the outermost guides 18 are present, as a result of which the goods are gradually moved towards one another as a pack as a result of the funnel-shaped construction of said guides. In a manner not shown in more detail, a packing or take-up station is installed downstream of the right-hand end in FIG. 1.

The assembly described above functions as follows: different types of goods are fed on the feed conveyors 2–6. In this case there are five different types of goods, but it will be understood that any number between two and a few tens can be used. Moreover, it is possible to move the same goods with different feed conveyors. As is shown in FIG. 1, these can be on either side of the collection conveyor.

The goods are first placed in the containers 7 of the feed conveyor concerned. These are then moved to above the collection conveyor 10. There is a specific position above the collection conveyor for each feed conveyor 2–6. That is to say each line 16 is always designed to receive one or more products from a specific feed conveyor 2–6. The movement of the holder 7 concerned is stopped at that specific position. Subsequent containers are buffered in a waiting position. If the correct "track compartment" appears, that is to say if there is the desired free space between two transverse bars 11 beneath the discharge conveyor concerned, the product or the series of products from the last holder concerned, or from the containers concerned, will be placed with the ejector device 17 in the relevant line between the longitudinal guides located opposite one another. This transfer of the product can take place gradually, without damage or uncontrolled movement of the product or pack concerned taking place. Starting from feed conveyor 2, at that point in time the lines 16 that do not interact with the feed conveyor will be empty. On movement of the track section filled with the product originating from feed conveyor 2 between two transverse bars 11 towards the discharge end of feed conveyor 3, when it is in the optimum position with respect to the latter the product concerned will be transferred by the relevant ejector 17 from the discharge end of feed conveyor 3 into another line 16. In this way a pack of goods can be built up step by step. As a result of the buffering of the containers containing the goods, continuous operation of the feed is not necessary. That is to say, interruptions before filling the supply to the feed conveyor do not have an adverse effect on the subsequent course of the process. Once a series of goods has been brought together, these will be removed in some way or other at the (other) discharge end of the collection conveyor.

It will be understood that by means of the present invention it is possible in a particularly simple manner to produce packs of different goods with, in each case, different compositions of the packs, at a high compilation speed thereof. It will also be understood that numerous further devices that are known in the state of the art can be employed. For instance, measures can be taken to keep and/or to bring the goods into the correct position both during movement on the feed conveyor and when transferring to the collection conveyor and when moving along the collection conveyor. The goods can be placed in any desired position. The various aspects are dependent on the goods. The use of buffering of the goods can be replaced by another supply control mechanism.

These and further variants are obvious and within the scope of the appended claims.

What is claimed is:

1. Assembly for collecting different goods comprising:
   at least two feed conveyors for said goods;
   collection conveyor extending at an angle to said feed conveyors, one end of said collection conveyor is arranged below said feed conveyors close to a discharge end thereof to receive said goods therefrom and the other end of said collection conveyor is constructed to collect together said goods to form a pack;
   said feed conveyors comprising containers for accommodating said goods and discharge means for discharging said goods on to said collection conveyor;
   said collection conveyor having, close to said one end of said collection conveyor, at least two separate transport lines arranged in parallel next to one another with a common drive for said goods; and
   means for moving said goods towards one another in a direction essentially transverse to a direction of transport of said goods arranged close to said other end of said collection conveyor;
   wherein said at least two separate transport lines stop immediately upstream of said means for moving said goods towards one another.

2. Assembly according to claim 1, wherein said feed conveyors are provided a buffer at the discharge end thereof.

3. Assembly according to claim 1, wherein said containers are open on least one side and said discharge means comprise ejection means for sliding said goods out of said containers.

4. Assembly according to claim 1, wherein a direction of transport of said goods at said discharge end on the feed conveyor is essentially perpendicular with respect to the direction of transport of said goods at said one end of said collection conveyor.

5. Assembly according claim 1, wherein said common drive comprises a plurality of bars mounted on said collection conveyor and located equidistance apart, wherein a space for accommodating goods delimited between every two bars.

* * * * *